United States Patent [19]

Bethune et al.

[11] Patent Number: 5,374,463
[45] Date of Patent: Dec. 20, 1994

[54] MAGNETIC RECORDING DISK HAVING A CONTIGUOUS FULLERENE FILM AND A PROTECTIVE OVERCOAT

[75] Inventors: Donald S. Bethune, San Jose; Mattanjah Sjim'on de Vries, Los Gatos, both of Calif.; Gerard Meijer, Nijmegen, Netherlands; Vlad J. Novotny, Cupertino, Calif.; Timothy C. Reiley, Los Gatos, Calif.; Anthony W. Wu, San Jose, Calif.

[73] Assignee: International Business Machines Corporation, Armonk, N.Y.

[21] Appl. No.: 815,120

[22] Filed: Oct. 22, 1991

[51] Int. Cl.$^5$ .................................. G11B 5/00
[52] U.S. Cl. ................................ 428/64; 428/141; 428/142; 428/408; 428/694 TC; 428/694 TR; 428/900; 360/102; 360/103; 360/135
[58] Field of Search ............. 428/694, 695, 900, 408, 428/694 TC, 694 TR, 141, 142, 64; 360/102, 103, 135

[56] References Cited

U.S. PATENT DOCUMENTS

| | | | |
|---|---|---|---|
| 4,167,765 | 9/1979 | Watrous | 360/103 |
| 4,503,125 | 3/1985 | Nelson et al. | 428/408 |
| 4,542,071 | 9/1985 | Homola et al. | 428/428 |
| 4,774,147 | 9/1988 | Kuse et al. | 428/323 |
| 4,778,582 | 10/1988 | Howard | 204/192.15 |
| 4,804,590 | 2/1989 | Nakamura et al. | 428/408 |
| 4,891,114 | 1/1990 | Hitzfeld et al. | 204/192.15 |
| 5,045,165 | 9/1991 | Yamashita | 204/192.16 |
| 5,084,319 | 1/1992 | Hibst et al. | 428/64 |
| 5,182,166 | 1/1993 | Burton et al. | 428/368 |
| 5,269,953 | 12/1993 | Whewell | 252/30 |

FOREIGN PATENT DOCUMENTS 367510  5/1990  European Pat. Off. .
63-079230  4/1988  Japan .

OTHER PUBLICATIONS

Kroto, Harold "Space, Stars", $C_{60}$, and Soot Science Nov. 1988 p. 11394.
Article: "Fullerenes", *Scientific American,* Oct. 1991, pp. 54–63.
"Buckyball–The Magic Molecule," *Popular Science,* Aug. 1991, pp. 52ff.
Surface Science 156 Jan (1985), p. 814, "Spectroscopy of Matrix-Isolated Carbon Cluster Molecules Between 200 and 850 nm Wavelength".
Phys. Chem. Oct. 1990, 94 pp. 8634–8636.

*Primary Examiner*—Stevan A. Resan
*Attorney, Agent, or Firm*—Thomas R. Berthold

[57] ABSTRACT

A film comprising fullerene molecules or their derivatives, preferably $C_{60}$ or $C_{70}$ fullerene molecules, is used as a lubricating film between two bearing surfaces. In a particular embodiment, a data recording disk file with the film deposited on the disk surface has improved properties of static friction and wear resistance at the head-disk interface.

7 Claims, 3 Drawing Sheets

MAGNETIC RECORDING DISK HAVING A CONTIGUOUS FULLERENE FILM AND A PROTECTIVE OVERCOAT

TECHNICAL FIELD

This invention relates to bearing systems of two bearing surfaces with a lubricating film located between the two surfaces. More particularly, the invention relates to a data recording disk file having a new type of lubricating film at the head-disk interface.

BACKGROUND OF THE INVENTION

In many types of rotating rigid disk files, each of the read/write transducers (or heads) is supported on a carrier (or slider) which rides on a cushion or bearing of air above the surface of its associated disk when the disk is rotating at its operating speed. The slider is connected to a linear or rotary actuator by means of a relatively fragile suspension. There may be a stack of disks in the disk file with the actuator supporting a number of sliders. The actuator moves the sliders radially so that each head may access the recording area of its associated disk surface.

In these conventional disk files the slider is biased towards the disk surface by a small force from the suspension. The slider is thus in contact with the disk surface from the time the disk file is turned on until the disk reaches a speed sufficient to cause the slider to ride on the air-bearing. The slider is again in contact with the disk surface when the disk file is turned off and the rotational speed of the disk falls below that necessary to create the air-bearing. In such contact start/stop (CSS) disk files a lubricant is often maintained on the disk surface to prevent damage to the head and the disk during starting and stopping of the disk.

One type of disk for use in rigid disk files is a thin film metal alloy disk which typically comprises a substrate, such as an aluminum-magnesium (AlMg) alloy with a nickel-phosphorous (NiP) surface coating, a cobalt-based alloy sputter deposited as the magnetic layer on the substrate, and a protective overcoat, such as a sputter-deposited amorphous carbon film, formed on the magnetic layer. U.S. Pat. No. 4,503,125 describes a protective overcoat of amorphous carbon formed by sputtering a graphite target. Assignee's U.S. Pat. No. 4,778,582 describes a protective hydrogenated carbon overcoat formed by sputtering a graphite target in the presence of Ar and hydrogen ($H_2$). In addition to the magnetic layer and the protective overcoat, thin film disks may also include a sputter-deposited underlayer, such as a layer of chromium (Cr) or chromium-vanadium (CrV), between the substrate and the magnetic layer.

In addition to the above-described conventional CSS magnetic recording disk files, disk files have been proposed wherein the head-disk interface includes a liquid film as a liquid bearing between the transducer carrier and the disk. An example of this type of liquid-bearing interface disk file is described in assignee's pending application, U.S. Ser. No. 264,604, filed Oct. 31, 1988, and published May 9, 1990 as European published application EP 367510.

A problem in both conventional air-bearing interface disk files and the proposed liquid-bearing interface disk files, both of which may use thin film disks as described above, is the suitability of the disk protective overcoat to provide resistance to wear caused by contact of the carrier which supports the magnetic recording transducer.

In order to improve the wear resistance of the disk it is necessary to make the disk surface as smooth as possible. However, a very smooth disk surface creates an additional problem known as "stiction". In the case of air-bearing interface disk files this means that after the slider has been in stationary contact with the disk surface for just a short period of time, the slider tends to resist translational movement or "stick" to the disk surface. This "stiction" is caused by a variety of factors, including static friction and adhesion forces between the disk and slider created by the lubricant. Stiction occurs even with smooth unlubricated disk surfaces because of the strong intermolecular attraction at the interface between the smooth disk and slider surfaces. Stiction in a disk file can result in damage to the head or disk when the slider suddenly breaks free from the disk surface when disk rotation is initiated. In addition, because the suspension between the actuator and the slider is relatively fragile in order to permit the slider to fly above the disk surface, sudden rotation of the disk can also damage the suspension.

In order to minimize stiction, the disk substrate may be mechanically textured so that the overlying protective overcoat, which will generally conform to the surface topography of the substrate, presents a "textured" surface to the slider. However, while a textured disk surface may be conducive to stiction reduction, as previously explained a textured disk surface may have inferior wear resistance.

What is needed is an improved lubricating film between the transducer carrier and the disk which minimizes wear of the protective overcoat and the underlying magnetic film on the disk, and which generates a low stiction interface when used with CSS disk files.

The above description summarizes the general operation of and problems associated with disk files. With this as background, a second unrelated technology area important to an understanding of the present invention is the relatively recent field of study relating to fullerenes. Fullerenes are a class of pure carbon molecules wherein the carbon atoms form a closed shell. The most stable and abundantly produced fullerenes are the $C_{60}$ molecule, which has the shape of a soccer ball and is also referred to as a "buckyball," and the $C_{70}$ molecule, which has the general shape of a rugby ball. The history of the discovery of fullerenes and a summary of their properties and potential applications are described in "Fullerenes", *Scientific American*, October, 1991, pp. 54–63 and "BUCKYBALL-The Magic Molecule," *Popular Science*, August, 1991, p.52ff.

SUMMARY OF THE INVENTION

The invention is a bearing system comprising first and second bearing surfaces and a lubricating film containing fullerene molecules or their derivatives located between the bearing surfaces. The invention has specific applications in disk files to provide a lubricating film at the interface of the disk and the transducer carrier. In one embodiment, a film comprising essentially $C_{60}$ molecules is formed on the carbon overcoat of a thin film metal alloy magnetic recording disk. In a second embodiment, the film comprises fullerene molecules which are deposited on and attached to the magnetic recording layer of the disk by an overcoat of sputter deposited essentially amorphous carbon so that the resulting film has an inherent texture.

For a fuller understanding of the nature and the advantages of the present invention, reference should be made to the following detailed description taken in conjunction with the accompanying drawings.

DESCRIPTION OF THE PREFERRED EMBODIMENTS

Figure 1:
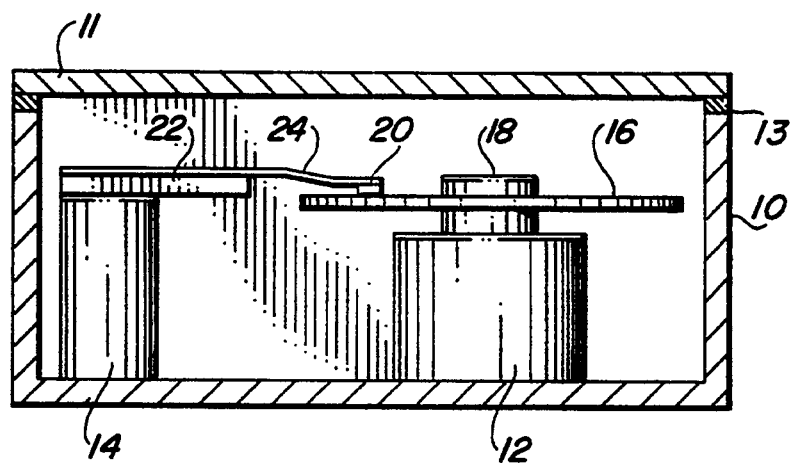
FIG. 1 is a schematic side view of a conventional disk file.

Referring first to FIG. 1, there is illustrated in sectional view a schematic of a conventional disk file. The disk file comprises a base 10 to which are secured a disk drive motor 12 and an actuator 14, and a cover 11. The base 10 and cover 11 provide a substantially sealed housing for the disk drive. Typically there is a gasket 13 located between base 10 and cover 11 and a small breather port (not shown) for equalizing pressure between the interior of the disk file and the outside environment. This type of disk file is described as being substantially sealed since the drive motor 12 is located entirely within the housing and there is no external forced air supply for cooling the interior components. A magnetic recording disk 16 is mounted on a hub 18, which is attached for rotation by drive motor 12. The disk 16 may be a conventional disk comprising an AlMg substrate with a NiP surface coating, a Cr underlayer over the NiP coating, a Co alloy magnetic layer over the Cr underlayer, and an amorphous carbon or hydrogenated carbon overcoat on the magnetic layer. A read/write head or transducer (not shown) is formed on a transducer slider or carrier 20. The carrier 20 is connected to the actuator 14 by means of a rigid arm 22 and a suspension 24, the suspension 24 providing a biasing force which urges the transducer carrier 20 toward the surface of the recording disk 16. During operation of the disk file the drive motor 12 rotates the disk 16 at a constant speed, and the actuator 14, which is typically a linear or rotary voice coil motor (VCM), moves the transducer carrier 20 generally radially across the surface of the disk 16 so that the read/write head may access different data tracks on disk 16. In CSS disk files the carrier 20 is an air-bearing slider which is in contact with the surface of disk 16 during start and stop operations and which is maintained above the surface of the disk 16 by an air bearing generated by the rotating disk and the air-bearing surface of the slider when the disk file is operating. In liquid bearing disk files the suspension 24 would maintain the carrier 20 in contact with the liquid lubricant film on the surface of disk 16 during operation of the disk file as well as during start and stop operations.

Figure 2:
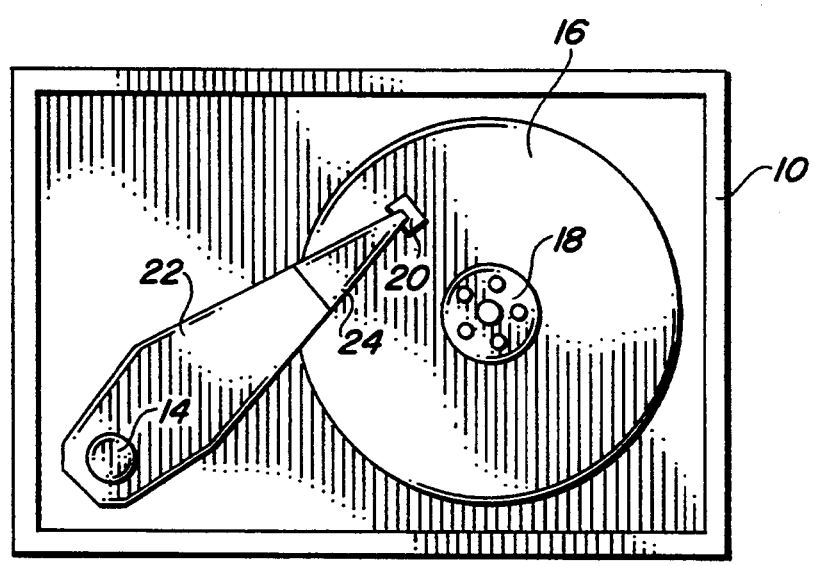
FIG. 2 is a top view of the disk file of FIG. 1 with the cover removed.

FIG. 2 illustrates a top view of the interior of the disk file with the cover 11 removed. In the present invention the fullerene lubricating film is maintained on the surface of disk 16. FIG. 2 also illustrates in better detail the suspension 24 which may be a conventional type of suspension such as the well-known Watrous suspension, described in assignees' U.S. Pat. No. 4,167,765.

In order to generate the lubricating film for use in disk files, $C_{60}$ and $C_{70}$ fullerenes were produced by arc heating of graphite in He, a method used by Kratschmer, Sorg and Huffman to produce carbon clusters as early as 1984, and described in *Surf. Sci* 156 (1985) p.814. A more recent implementation of this method is described by Haufler et al. in *J.Phys. Chem.* 94 (1990) pp.8634–8636. Briefly, a current of approximately 100 Amps was passed between two 6 mm diameter carbon rods, nearly in contact, in a chamber of He maintained at 100–150 Torr. $C_{60}$ and $C_{70}$ molecules (along with small amounts of higher numbered fullerenes) were extracted from the collected soot with hot toluene. Separation of the $C_{60}$ and $C_{70}$ molecules was achieved by dispersing a 10 mg sample of the extracted material onto 1 gm of silica, applying the dispersion to the top of a column of active alumina, and eluting with 500 ml each of hexane, 5% benzene in hexane, and finally 20% benzene in hexane at a flow rate of 1.5 ml/min. The fractions were analyzed by laser desorption/laser ionization mass spectrometry. The separated $C_{60}$ contained less than 1% $C_{70}$, while the $C_{70}$ fractions had less than 5% $C_{60}$. Either purified $C_{60}$ or $C_{70}$, or their mixtures, can be used for disk lubrication.

In order to form one embodiment of the lubricating film, the fullerenes were then deposited onto the disks by loading some of the purified material (dissolved in toluene) into a resistively heated stainless steel tube oven with a small opening which was placed in a bell jar and evacuated to approximately $10^{-6}$ Torr. After heating the oven to 150 degrees C. for five minutes, the disks were rotated above the opening in the tube. Heating the tube further (to approximately 550 degrees C.) then sublimed the molecules onto the disks. The disks used had cobalt-platinum-chromium magnetic layers formed over AlMg/NiP substrates and amorphous hydrogenated carbon films formed over the magnetic layers. As an alternative to this deposition method, the fullerene films can be deposited onto the disks from a solution containing the fullerene molecules by dipping or spin coating.

Figure 3:
FIG. 3 is a scanning tunneling microscope (STM) image of a fullerene film.

FIG. 3 is a scanning tunneling microscope (STM) image of a film of $C_{60}$ and $C_{70}$ molecules deposited by evaporation in vacuum onto a nonreactive gold surface. The elongated, taller structures in the image are the $C_{70}$ molecules. Similarly coated disks were tested for stiction and wear-resistance and compared with reference disks of the same type but having a conventional perfluoropolyether lubricant on the carbon film. The fullerene coated disk which was tested had approximately 30 Angstroms, i.e. 4 monolayers, of fullerenes. The reference disk had only bonded lubricant, approximately 15 Angstroms of Z-dol perfluoropolyether from Montedison.

Wear resistance testing was done in CSS mode with sliders having a silicon/carbon overcoat on the air-bearing surface and a load of 6 gm applied by the suspensions. The CSS testing was done at approximately 30% relative humidity. The fullerene disk showed excellent wear resistance, with a lifetime in excess of 300 k CSS cycles with average stiction $\leq 20$ gmf. The fullerene disk had durability performance as good as the reference disk. The wear resistance experiments on fullerene coated disks with the above thickness of fullerenes were repeated several times and were truncated without failure and with low stiction (≦20 gmf) at 10 k to 50 k CSS cycles. When thicker fullerene coatings (≦100–150 Angstroms) were used, clear removal of fullerenes from the disk tracks occurred. When thin fullerenes coatings (≦7 Angstroms) were used, durability was not as good as for disks containing 30 Angstrom thick fullerene films.

Figure 4:
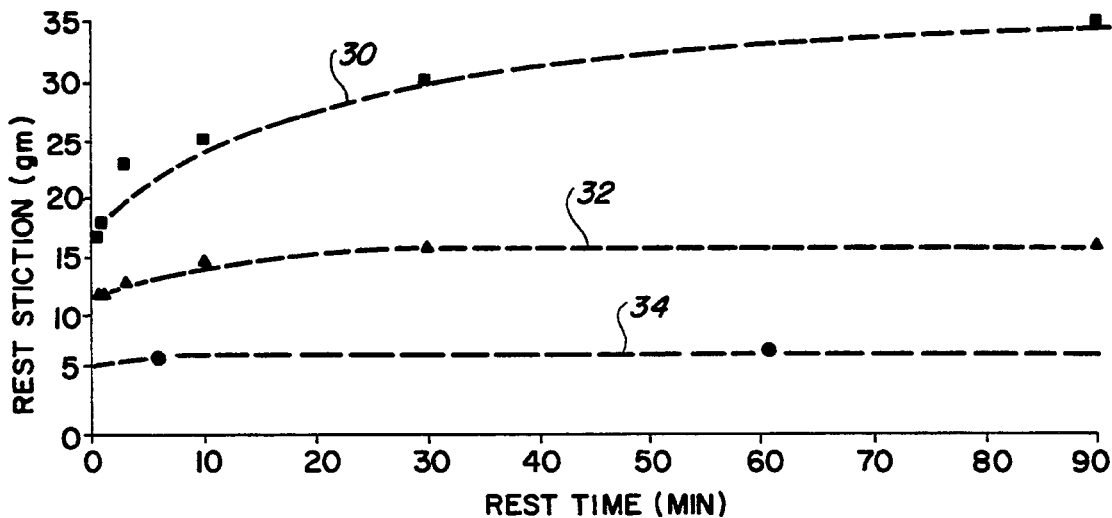
FIG. 4 is a graph comparing rest stiction of a disk file of the present invention to rest stiction of a conventional disk file.

Comparison of rest stiction of the reference and the fullerene disks is shown in FIG. 4. The disk lubricated with the fullerene film consisting essentially of $C_{60}$ molecules (curve 32) clearly has much better performance than the disk with bonded Z-dol lubricant (curve 30). Disks with free lubricant in addition to bonded lubricant exhibit a much higher increase in stiction with rest time than disks containing only bonded lubricant. This increase is mainly due to the capillary condensation of free lubricant between the disk and the slider. This process does not occur with solid, inorganic fullerenes and consequently, fullerene lubricants do not exhibit any significant increase in stiction with rest time.

Figure 5:
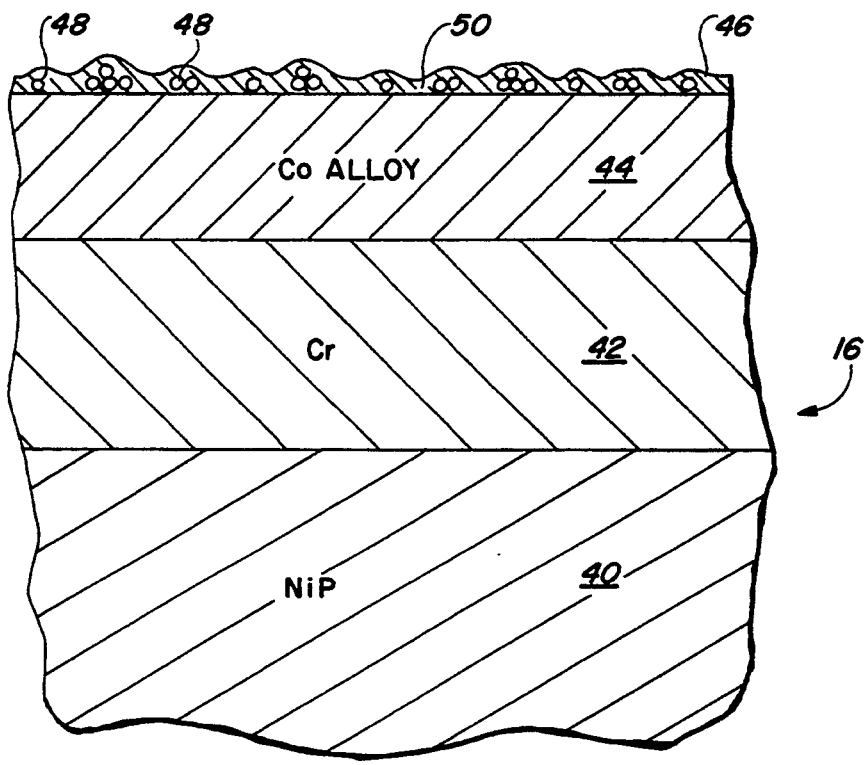
FIG. 5 is a sectional view of a magnetic recording disk illustrating a second embodiment of the lubricating film containing fullerenes.

In a second embodiment of the lubricating film to improve head-disk performance, the fullerene molecules are adhered to the disk surface by sputter-deposited amorphous carbon. As shown in FIG. 5, the disk 16 includes a substrate (shown as the NiP coating 40 of an AlMg/NiP substrate), a Cr underlayer 42, a Co alloy magnetic layer 44 and the lubricating film 46. Film 46 comprises individual fullerene molecules or clusters of fullerene molecules 48 on the magnetic layer 44 and surrounded by amorphous carbon 50 which has been sputter deposited onto the magnetic layer 44 to bond or adhere the fullerene molecules 48 to the disk 16. The resulting lubricating film 46 has an inherent surface texture due to the fullerene molecules 48 contained therein.

In the formation of this film a 25 mg mixture of $C_{60}$ and $C_{70}$ molecules, prepared in the manner described previously, was dissolved in toluene. The solution was then placed in a syringe with filter and then deposited onto the CoCr magnetic layer of a 5¼ in. diameter AlMg/NiP disk. The disk was spun at 1000 RPM for 120 seconds. The toluene evaporated within the first few seconds. Based on the amount of fullerene molecules in the solution applied to the disk, it is estimated that an amount equivalent to approximately one third of a monolayer of fullerene molecules were deposited onto the magnetic layer. The disk was then dried in air and placed in a DC magnetron sputtering chamber where amorphous carbon was sputter deposited to a thickness of approximately 100 Angstroms over the fullerene molecules. A conventional perfluoropolyether liquid lubricant was then bonded to the film to a thickness of approximately 10 Angstroms. Rest stiction measurements were made and showed a stiction of approximately 5 gm over a range of 0 to 48 hours (See curve 34 in FIG. 4) as compared with 50 gm. or higher for a control disk made without the lubricating film containing fullerenes.

While the preferred embodiments of the present invention have been illustrated in detail, it should be apparent that modifications and adaptations to those embodiments may occur to one skilled in the art without departing from the scope of the present invention as set forth in the claims.

For example, although in the preferred embodiments the lubricating film containing fullerenes resides on the disk, it may also be possible to deposit the film onto the surface of the transducer carrier or to provide the film as a liquid emulsion or solution which contains fullerene molecules. Also, since the experimental data establishes that the film is an excellent lubricant between two essentially flat bearing surfaces, the disk surface and the slider air-bearing surface, the film may also serve to provide lubrication between other bearing surfaces in addition to the head-disk interface in a CSS disk file.

In addition, while the specific embodiments described above utilized fullerene molecules, it may also be possible to use derivatives of fullerene molecules in place of or in addition to fullerene molecules. In one type of fullerene molecule derivative, some of the carbon atoms in the closed shell are replaced by other atoms, such as boron atoms. In another type of derivative, other atoms or molecules, such as hydrogen or fluorine, are attached to the outside of the closed carbon shell by bonding to the carbon atoms.

What is claimed is:

1. A bearing system comprising a first member having an essentially flat bearing surface, a second member having an essentially flat bearing surface, a film comprising contiguous fullerene molecules attached to one of the essentially flat bearing surfaces, and a protective overcoat formed on the fullerene film, the overcoat having a surface texture generally replicating the underlying fullerene film.

2. The system of claim 1 wherein the first member is a rigid data recording disk and the second member is a carrier for a data recording transducer.

3. The system of claim 2 wherein the rigid data recording disk is a magnetic recording disk and wherein the second member is a carrier for a magnetic recording transducer.

4. The system of claim 1 wherein the fullerene molecules are $C_{60}$ or $C_{70}$ molecules or their derivatives.

5. A data recording disk file comprising:
   a data disk;
   means connected to the disk for rotating the disk;
   a transducer for writing data to or reading data from the disk;
   a carrier for supporting the transducer;
   a film consisting essentially of contiguous $C_{60}$ or $C_{70}$ fullerene molecules or their derivatives attached to the surface of the disk or the carrier;
   a protective overcoat comprising essentially amorphous carbon formed over the fullerene film, the carbon overcoat having a surface texture generally replicating the fullerene film; and
   an actuator connected to the transducer carrier for moving the carrier generally radially across the disk so the transducer may access different regions of data on the disk.

6. The disk file according to claim 5 wherein the transducer carrier is an air-bearing slider.

7. A magnetic recording disk comprising a substrate, a cobalt alloy magnetic recording layer formed over the substrate, a film consisting essentially of contiguous $C_{60}$ or $C_{70}$ fullerene molecules or their derivatives formed on the magnetic recording layer, and a protective overcoat comprising essentially amorphous carbon formed on the fullerene film, the carbon overcoat having a surface texture generally replicating the surface of the underlying fullerene film.

* * * * *